United States Patent
Kim et al.

(10) Patent No.: US 8,238,648 B2
(45) Date of Patent: Aug. 7, 2012

(54) APPARATUS AND METHOD FOR ESTIMATING FOCAL LENGTH OF CAMERA

(75) Inventors: Jae Chul Kim, Taejon (KR); Chang Woo Chu, Taejon (KR); Ho Won Kim, Taejon (KR); Jeung Chul Park, Jeollabuk-Do (KR); Ji Young Park, Seoul (KR); Seong Jae Lim, Gwangju (KR); Bon Ki Koo, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 1198 days.

(21) Appl. No.: 11/945,759

(22) Filed: Nov. 27, 2007

(65) Prior Publication Data

US 2008/0131108 A1    Jun. 5, 2008

(30) Foreign Application Priority Data

Dec. 4, 2006 (KR) .................. 10-2006-0121355
Oct. 5, 2007 (KR) .................. 10-2007-0100389

(51) Int. Cl.
*G06K 9/00* (2006.01)
(52) U.S. Cl. ................. 382/154; 382/255; 382/285
(58) Field of Classification Search .................. 382/154, 382/255, 284
See application file for complete search history.

(56) References Cited

U.S. PATENT DOCUMENTS

| | | | |
|---|---|---|---|
| 6,437,823 B1 | 8/2002 | Zhang | |
| 7,155,030 B2 * | 12/2006 | Kim et al. | 382/100 |
| 7,565,029 B2 * | 7/2009 | Zhou et al. | 382/284 |
| 7,936,915 B2 * | 5/2011 | Brown et al. | 382/154 |
| 2005/0207640 A1 * | 9/2005 | Kim et al. | 382/154 |
| 2007/0008312 A1 * | 1/2007 | Zhou et al. | 345/419 |
| 2007/0237417 A1 * | 10/2007 | Agrawal | 382/255 |
| 2008/0131108 A1 * | 6/2008 | Kim et al. | 396/77 |
| 2008/0298706 A1 * | 12/2008 | Brown et al. | 382/255 |

OTHER PUBLICATIONS

Mendoca et al.; A Simple Technique for Self-Calibration; 1063-6919/99 $10.00 (C) 1999 IEEE.
P. Sturm et al.; Focal length calibration from two views: method and analysis of singular cases; Computer Vision and Image Understanding 99 (2005); pp. 58-95.

* cited by examiner

*Primary Examiner* — Aaron W Carter
(74) *Attorney, Agent, or Firm* — Lowe Hauptman Ham & Berner, LLP

(57) ABSTRACT

Provided is a camera self-calibration method that calculates a focal length of a fixed zoom lens camera from a correspondence point position between images. In the method, a cost function, which is a function of a focal length, is defined, and a focal length that minimizes the defined cost function is obtained to obtain a focal length that allows 3D recovery results of correspondence points calculated from all image pairs coincide with one another. Therefore, reliability of the calculated focal length can be easily verified, and the focal length of the camera can be stably calculated even when the position of input correspondence point is inaccurately given.

19 Claims, 4 Drawing Sheets

APPARATUS AND METHOD FOR ESTIMATING FOCAL LENGTH OF CAMERA

BACKGROUND OF THE INVENTION

1. Field of the Invention

The present invention relates to camera self-calibration technology for calculating a focal length, a position, and a direction of a camera from the position of a correspondence point between images, and more particularly, to a method for estimating a focal length to automatically calibrate a camera using directional coincidence of 3 dimension (D) coordinate systems having geometrically meaningful values in a 3D Euclidean space as a restriction condition.

2. Description of the Related Art

As a method for automatically calibrating a camera of a fixed local length, Sturm has derived Equation for calculating a focal length using a closed form from singular value decomposition (SVD) of a fundamental matrix that can be obtained from a position of a correspondence point between images.

The Equation derived by Sturm has been calculated using an absolute quadric, which is an imaginary geometric entity defined in a complex number space.

Since the imaginary geometric entity has been used, any measurable reference that can guarantee accuracy of calculation does not exist in the case where an error is generated to the position of a correspondence point. Accordingly, the method by Sturm provides results very sensitive to an image noise.

Meanwhile, a method for defining a cost function for automatic calibration and calculating a focal length that minimizes the cost function through non-linear optimization has been proposed.

Mendonca and Cipolla have defined the cost function by applying a restriction condition that two initial singular values of an essential matrix should be the same at an accurate focal length. Also, they have calculated a focal length that minimizes the cost function through non-linear optimization.

At this point, an initial value of a focal length for the non-linear optimization can be estimated by Sturm's method. This non-linear optimization method can obtain an accurate result compared to obtaining a solution of a closed form.

However, since a restriction condition applied to an essential matrix is also derived from an absolute quadric, which is an imaginary geometric entity, there does not exist a geometrical measurement reference that can guarantee the reliability of a calculating result. In the case where an image noise exists simply because a numerical value of a cost function is minimized, a reliability problem still exists.

SUMMARY OF THE INVENTION

Accordingly, the present invention is directed to an apparatus and a method for estimating a focal length of a camera, which substantially obviate one or more problems due to limitations and disadvantages of the related art.

It is an object of the present invention to provide an apparatus and a method for estimating a focal length of a camera that can stably and accurately estimate the focal length of the camera under an image noise by defining a cost function using directional coincidence of 3D coordinate systems having a geometrically meaningful value in a 3D Euclidean space as a restriction condition, and calculating the focal length that minimizes the defined cost function.

It is another object of the present invention to provide an apparatus and a method for estimating a focal length of a camera that can stably and accurately calculate a fixed zoom lens camera focal length under an image noise from the position of a correspondence point between images even when the position of correspondence points are inaccurately given.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an apparatus for estimating a focal length of a camera, the apparatus including: an image correspondence point position designating unit for designating a correspondence point position between image pairs in an input 2 dimension (D) image; a cost function defining unit for defining a cost function to obtain a focal length for camera self-calibration from the designated correspondence point position between the image pairs; and a cost function minimizing unit for calculating an optimized focal length that minimizes the defined cost function.

In another aspect of the present invention, there is provided a method for estimating a focal length of a camera, the method including the steps of: designating a correspondence point position of each image pair with respect to all image pairs of an input 2D image; calculating a 3D coordinate of the designated correspondence point through a computer-vision algorithm; defining a difference function from a 3D coordinate axis result recovered by applying similarity transform relation of each image pair to the calculated 3D coordinate; obtaining sum of the defined difference functions with respect to all the image pairs to define the sum as a cost function; and obtaining an optimized focal length that minimizes the defined cost function in a set search region.

As described above, unlike an existing method for deriving a calculation equation using an absolute quadric, which is an imaginary geometric entity, or absolute conic defined in a complex space, an apparatus and a method for estimating a focal length of a camera uses directional coincidence of 3D coordinate systems having a geometrically meaningful value in a 3D Euclidean space as a restriction condition to not only easily secure stability in calculating the focal length of the camera under an image noise, but also easily verify the reliability of a calculated focal length and stably obtain the focal length even when the position of an input correspondence point is inaccurately given.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

The present invention provides a camera self-calibration method that calculates a focal length of a fixed zoom lens camera from the position of a correspondence point between images. Therefore, three or more images and five or more correspondence points between images are required for camera self-calibration.

Also, generally, a restriction condition is applied to a camera focal length or camera movement for camera self-calibration. The present invention considers the case where the focal length of a camera is fixed during shooting.

Figure 1:
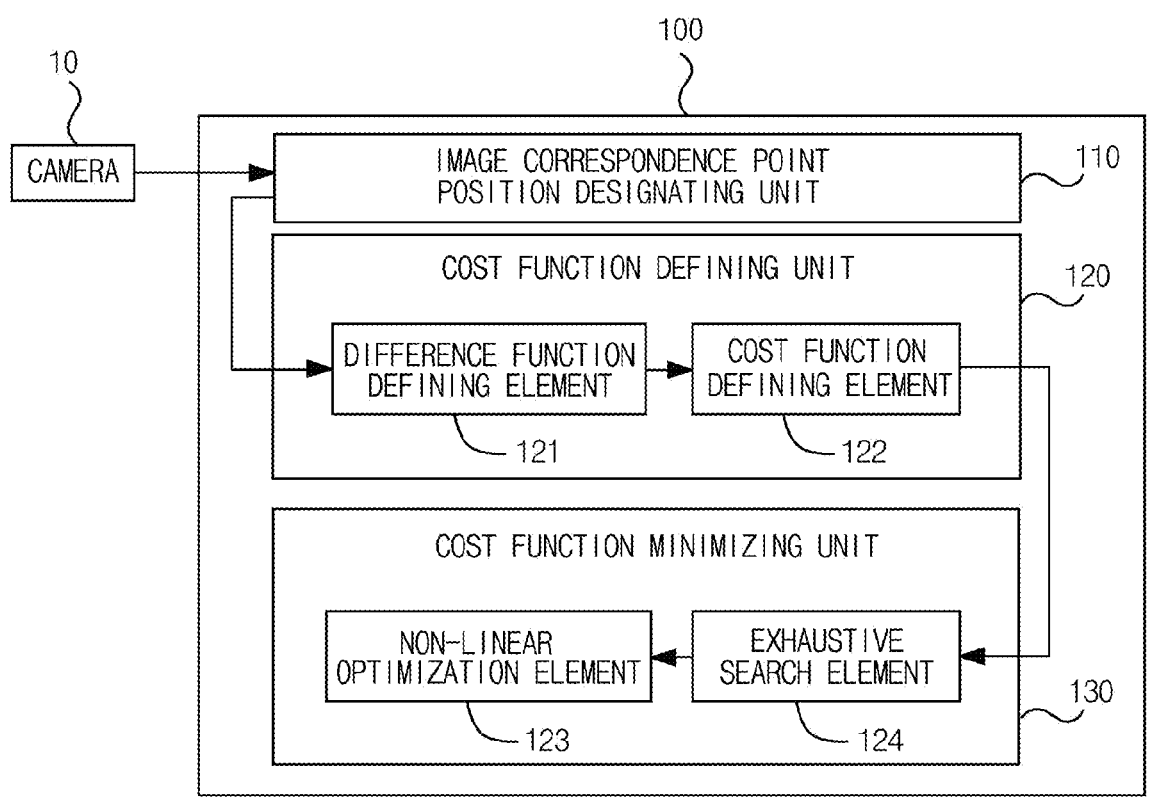
FIG. 1 illustrates an entire construction of an apparatus for estimating a focal length in a fixed zoom lens camera according to the present invention.

FIG. 1 illustrates an entire construction of an apparatus 100 for estimating a focal length in a fixed zoom lens camera according to the present invention. The apparatus 100 includes an image correspondence point position designating unit 110, a cost function defining unit 120, and a cost function minimizing unit 130.

The image correspondence point position designating unit 110 designates a correspondence point between image pairs from an image input from a plurality of cameras 10. Here, an image can be an image file shot by a digital camera, a digital scan of a photo shot by a film camera, or a moving image file shot by a video camera.

The correspondence point position between images can be manually designated by a user or automatically designated by applying a feature point detecting and tracking algorithm. There is no specific restriction in the method.

The cost function defining unit 120 obtains a difference function from a 3D recovery result with respect to a correspondence point designated by the image correspondence point position designating unit 110, and defines a cost function $D(f)$ for obtaining an optimized focal length for camera self-calibration using this difference function.

The cost function minimizing unit 130 calculates a focal length that minimizes the cost function $D(f)$ defined by the cost function defining unit 120. The calculation of the focal length is performed using exhaustive search of multi-resolution and a non-linear optimization algorithm.

Figure 2:
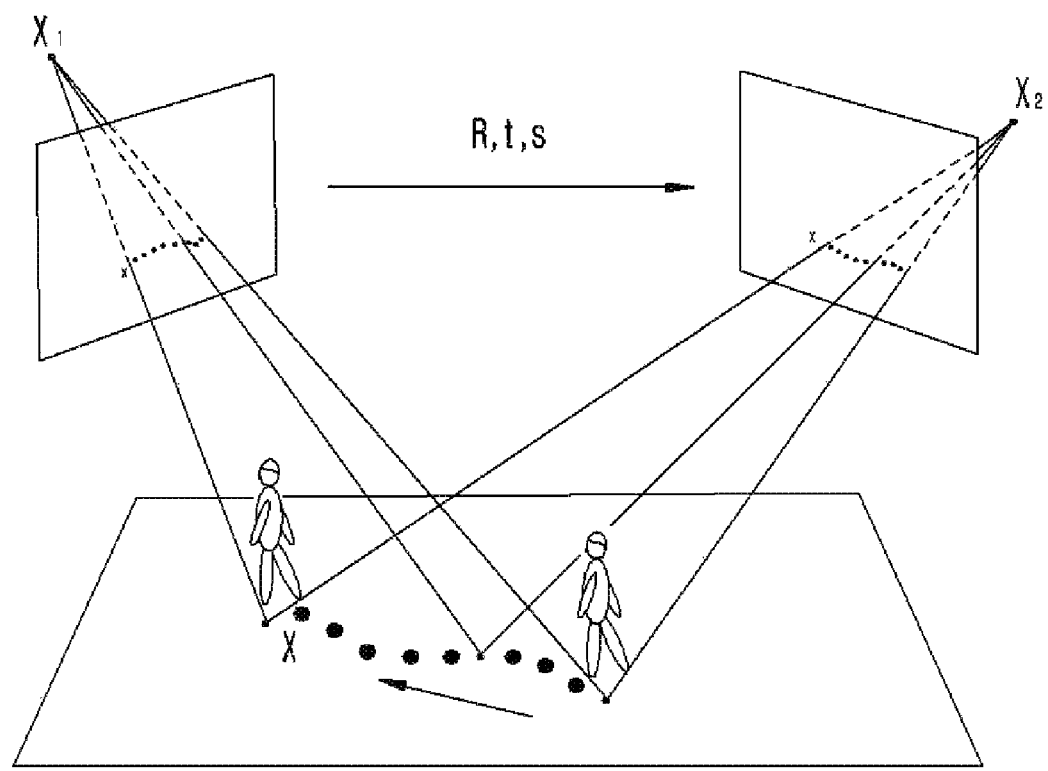
FIG. 2 illustrates relation between a 3D coordinate and a correspondence point between image pairs.

FIG. 2 illustrates concept that the image correspondence point position designating unit 110 designates a correspondence point between images. Referring to FIG. 2, a 3D coordinate is obtained for a correspondence point X of input image pairs P1 and P2 in a real world coordinate.

Figure 3:
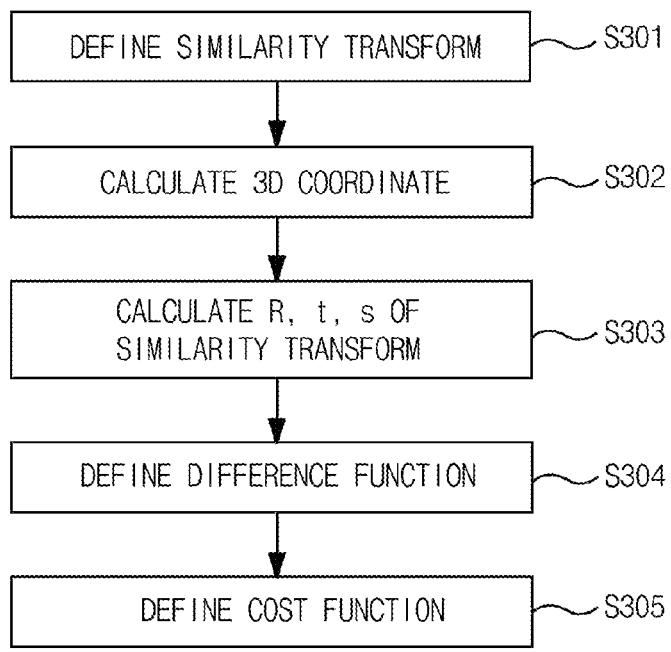
FIG. 3 illustrates a flowchart of a process for defining a cost function.

FIG. 3 is a flowchart illustrating in detail that a process in which the cost function defining unit 120 defines a cost function in order to calculate a camera focal length.

First, similarity transform between two 3D coordinate systems for a correspondence point designated by the image correspondence point position designating unit 110 is defined in the form of Equation 1 to obtain a difference function required for defining a cost function.

$$X_2 = sRX_1 + t, \quad \text{Equation 1}$$

where $X_1$ and $X_2$ are coordinates of arbitrary one point X on a 3D, respectively, in two coordinate systems, R is a rotation matrix of 3×3 in size, t is a translation vector of 3×1 in size, and s is a constant representing scale between the two coordinate systems.

B. K. P. Horn has showed in his paper titled "Closed-form Solution of Absolute Orientation Using Unit Quaternions" that when three or more 3D points are given, a unique solution determining similarity transform can be calculated in general.

Therefore, a unique solution is obtained from similarity transform between two 3D coordinate systems defined by Equation 1, and a reference for measuring a difference in a 3D recovery result between two images using the obtained unique solution.

First, it is assumed that there exist image pairs P1 and P2 including a reference image Ir in common. At this point, when an extract focal length of a camera is known, and five or more correspondence points exist in all images, 3D coordinates of respective correspondence points can be calculated from the image pairs P1 and P2.

The similarity transform relation expressed by Equation 1 exists between 3D coordinates of the correspondence points calculated from the image pairs P1 and P2.

Here, the 3D coordinates of the correspondence points can be calculated using 5-point, 6-point, 7-point, and 8-point algorithms, which are algorithms well-known in a computer vision field.

Since it has been assumed that there are five or more correspondence points in all images, R, t, and s of Equation 1 forming the similarity transform between the 3D coordinate systems of the two image pairs can be calculated from 3D coordinates of correspondence points obtained from the two image pairs using the algorithm of B. K. P. Horn.

Since the two image pairs P1 and P2 includes the common reference image Ir, all of the 3D coordinates of correspondence points can be calculated from the image pairs P1 and P2 using a camera coordinate system of the reference image Ir for a reference. By doing so, the 3D coordinate systems of the image pairs P1 and P2 are matched to the camera coordinate system of the reference image Ir.

Therefore, rotation and translation are removed from the similarity transform between the two 3D coordinate systems defined by Equation 1. In other words, only scale transform of $X_2 = sX_1$ holds between 3D coordinates $X_1$ and $X_2$ expressed in the two 3D coordinate systems for one correspondence point X.

Consequently, when the focal length of a camera is exact, a rotation matrix R obtained from similarity transform between two 3D coordinate systems should be an identity matrix, and a translation vector t should be a zero vector.

From the above description, a difference function $D(f)$ representing a difference in a 3D recovery result calculated from two image pairs P1 and P2 with respect to a given focal length is defined as follows.

$$D(f) = \Sigma_{i=1,2,3} \cos^{-1}(r_i \cdot e_i), \quad \text{Equation 2}$$

where $r_i$ ($i=1,2,3$) is a vector forming an i-th column of a rotation matrix R, $e_1 = [1,0,0]^T$, $e_2 = [0,1,0]^T$, $e_3 = [0,0,1]^T$, $\cos^{-1}(x)$ is an arc cosine function of x, and $r_i \cdot e_i$ is inner product of two vectors $r_i$, $e_i$.

Equation 2 (difference function $D(f)$) has a small value as a rotation matrix R forming the similarity transform expressed by Equation 1 approaches an identity matrix. In terms of geometrical analysis, Equation 2 (difference function $D(f)$) has a small value as the directions of the coordinates of the two image pairs obtained from 3D coordinates of correspondence points X calculated from the two image pairs P1 and P2 coincide with each other.

Meanwhile, Equation 2 (difference function D(f)) considers only the rotation matrix R in calculating a coincidence degree between the two coordinate systems. However, for more accurate calculation, the translation vector t should be considered.

That is, the two 3D coordinate systems coincide with each other as a norm value of the translation vector t is small. In terms of geometrical analysis, the difference function D(f) between the two coordinate systems has a small value as the positions of original points of the coordinate systems of the two image pairs coincide with each other.

Therefore, the difference function D(f) of Equation 2 can be defined as follows.

$$D(f) = \sum_{i=1,2,3} \cos^{-1}(r_i \cdot e_i) + \alpha \sqrt{\sum_{i=1,2,3} t_i^2},\qquad \text{Equation 3}$$

where a first term is the same as that of Equation 2, a second term is the norm of the translation vector t, $t_i(_i=1,2,3)$ is an i-th component of the translation vector t, and $\alpha$ is an arbitrary constant defining weight between the two terms.

Though Equation 3 can more accurately describe a coincidence degree between the two coordinate systems than Equation 2, actually, there is no great problem in obtaining a stable calculation result using even only Equation 2. Also, there exists a limitation that a calculation result changes depending on how the value of $\alpha$ Equation 3 is defined.

A cost function C(f) for camera self-calibration is defined as follows from the difference function D(f) defined by Equation 2 or 3.

$$C(f) = \sum_{k=2}^{n} D_k(f) \qquad \text{Equation 4}$$

where $D_k(f)$ is a difference function calculated between two image pairs P1 and Pk.

At this point, the image pair P1 includes a reference image Ir and an image I1, and the image pair Pk includes the reference image Ir and an image Ik.

Referring to Equation 4, the cost function C(f) is obtained by forming n image pairs P1, ..., Pn including the reference image Ir from (n+1) images including the reference image Ir and the rest images I1, ..., In, calculating a difference function $D_k(f)$ (k=2, ..., n) between the image pair P1 and the rest image pairs P2, ..., Pn, and summing up all of the calculated values.

Therefore, a focal length of the camera that allows 3D coordinates of correspondence points calculated from respective image pairs formed by input images coincide with one another at a maximum degree can be obtained by calculating the focal length that minimizes the cost function C(f) of Equation 4.

Meanwhile, the cost function C(f) of Equation 4 has a different value at the same focal length depending on combination of the reference image Ir and a first image I1 selected from the (n+1) input images.

Since the function value for the combination of the reference image Ir and the first image I1 selectable from the (n+1) input images should be calculated by n(n+1) times in total to solve this limitation, an amount of operations increases very much.

However, actually, since accuracy of a focal length provided even when the cost function is calculated only once with respect to the combination of an arbitrarily selected one reference image Ir and first image I1 generates no great limitation for practical use, repeated calculation for the cost function is not required generally.

Figure 4:
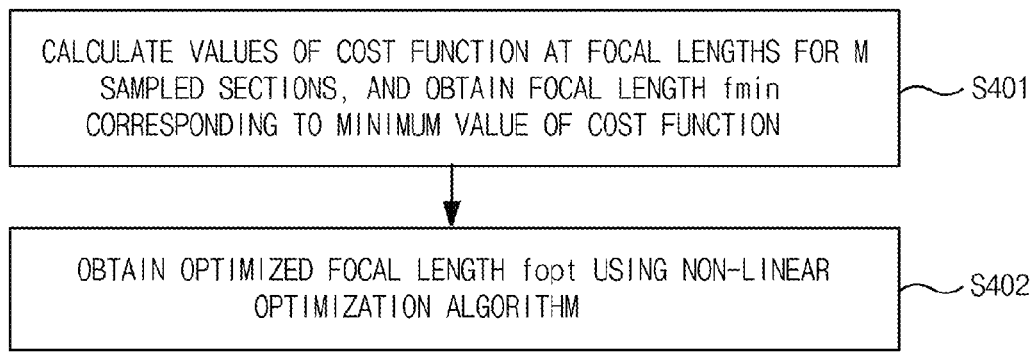
FIG. 4 illustrates a flowchart of a process for obtaining a focal length.

FIG. 4 is a flowchart explaining a process in which the cost function minimizing unit 130 obtains a focal length using the cost function C(f) defined by the cost function defining unit 120.

The cost function minimizing unit 130 calculates the focal length that minimizes the cost function D(f) defined by Equation 4. The calculation of the focal length is performed using the exhaustive search of multi-resolution and the non-linear optimization algorithm.

First, before the calculation of the focal length is performed, a range (search region) of values that can be used for a focal length is set in advance, and sampling is performed on m equally divided regions according to the present invention.

According to the present invention, a focal length reaching ⅕ times to 5 times of an input image size is set as the search region. However, the search region can be designated variously depending on an application field, and there is no specific restriction in the designating method.

After that, in a first process, values of the cost function C(f) of Equation 4 are calculated for sampled focal lengths $f_i(_i=1, \ldots, m)$ obtained by dividing the search region into m equal regions. A focal length fmim that minimizes the value of the cost function C(f) is obtained from the values of the cost function C(f) calculated for the sampled focal lengths $f_i(_i=1, \ldots, m)$ (S401).

In a second process, the focal length that minimizes the cost function C(f) is obtained with the fmim for an initial value using a non-linear optimization algorithm such as a Quasi-Newton method. The above obtained optimized focal length fopt is determined as the focal length of the camera (S402).

Meanwhile, in the case where a shooting position or posture of the camera are to be calculated, they can be simply obtained using 5-point, 6-point, 7-point, and 8-point algorithms, which are algorithms well-known in a computer vision field because the optimized focal length fopt and the correspondence positions between images are already known.

The method for estimating the focal length of a fixed zoom lens camera having the above-described construction according to the present invention is described with reference to FIG. 5.

Figure 5:
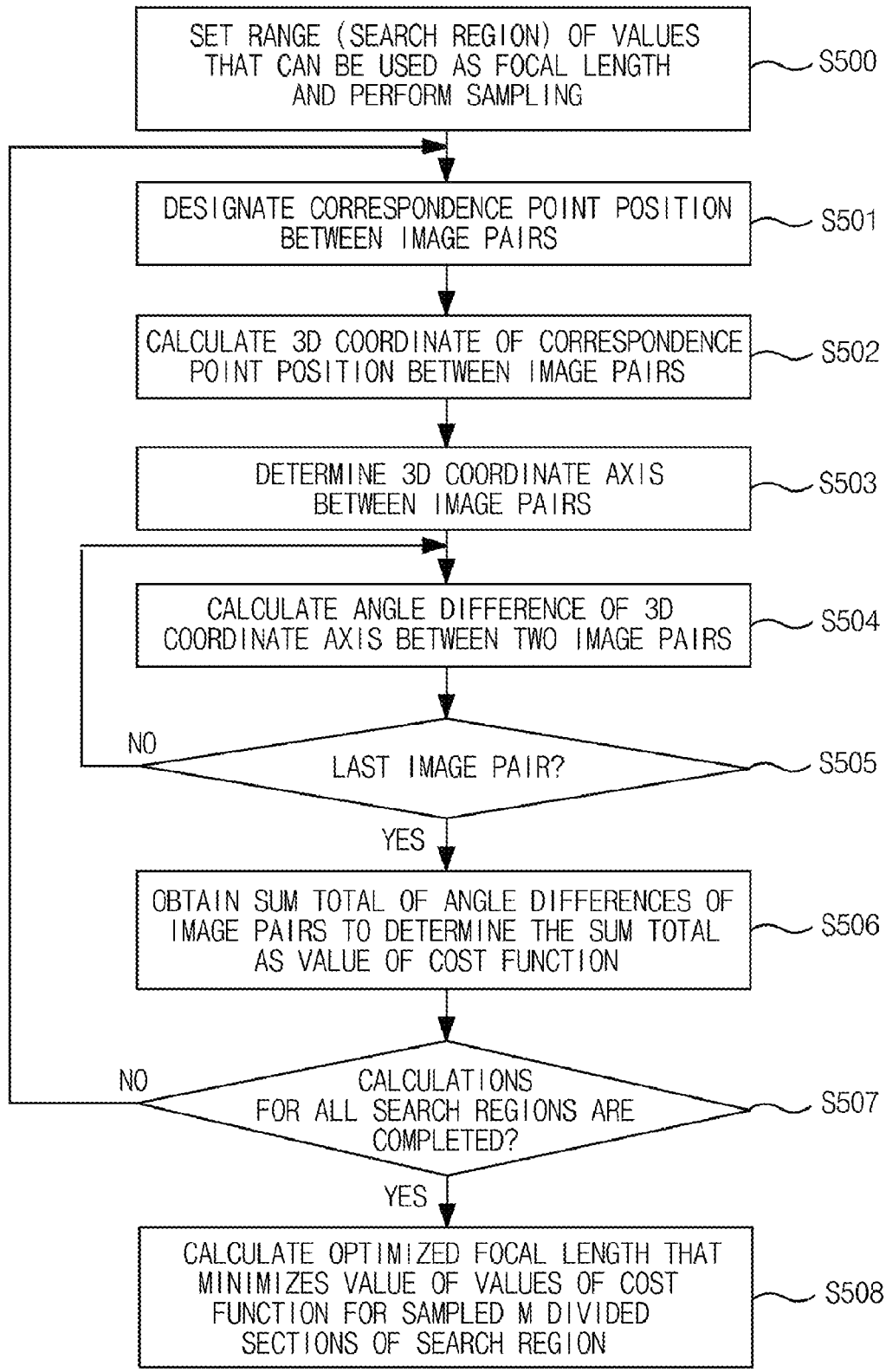
FIG. 5 illustrates a flowchart of a process for estimating a focal length of a fixed zoom lens camera according to the present invention.

FIG. 5 is a flowchart illustrating a method for estimating a focal length of a fixed zoom lens camera using a cost function according to the present invention.

First, a range (search region) of values that can be used as a focal length is set in advance, divided into m equal sections, and then sampled and stored (S500).

After that, the image correspondence point position designating unit 110 designates the position of a correspondence point X between image pairs with respect to a 2D input image in each sampled search region (S501).

After that, a 3D coordinate of the designated correspondence point X is calculated for each combination of image pairs P1 and P2 of the 2D input image at a given focal length (S502).

The 3D coordinate axes of the image pairs P1 and P2 are determined from a 3D coordinate of the correspondence point calculated from the image pairs P1 and P2 (S503).

An angle difference between the two 3D coordinate axes is calculated by comparing the directions of the 3D coordinate axes obtained from the two image pairs P1 and P2 (S504).

Whether performing process S504 on all image pairs P1, P2, . . . , Pn is completed is checked (S505). When the performing of process S504 on all the image pairs P1, P2, . . . , Pn is completed, process S504 returns and is repeatedly performed. When the performing of process S504 on all the image pairs P1, P2, . . . , Pn is not completed, the sum total of angle differences of the 3D coordinate axes calculated from respective image pairs is determined as the value of the cost function (S506).

Processes S501 to S506 are repeated for focal lengths of all search regions in a predetermined range to check whether processes S501 to S506 are completed (S507). When processes S501 to S506 are not completed, processes S501 to S506 are completed are repeated. When processes S501 to S506 are completed, a focal length that minimizes the value of the cost function is calculated (S508). Camera self-calibration is performed using the focal length obtained above.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for estimating a focal length of a camera, the apparatus comprising:
    an image correspondence point position designating unit for designating a correspondence point position between image pairs in an input 2 dimension (D) image;
    a cost function defining unit for defining a cost function to obtain a focal length for camera self-calibration from the designated correspondence point position between the image pairs, wherein the cost function defining unit comprises:
        a difference function defining element for defining a difference function from a recovery result of a 3D coordinate axis obtained by applying similarity transform to correspondence point between the image pairs, and
        a cost function defining element for defining sum of defined difference functions as the cost function to obtain the optimized focal length fopt; and
    a cost function minimizing unit for calculating an optimized focal length fopt that minimizes the defined cost function.

2. The apparatus of claim 1, further comprising a position and posture calculating unit for calculating a shooting position and a shooting posture of the camera through a computer-vision algorithm including 5 points, 6 points, 7 points, and 8 points using the optimized focal length fopt and the correspondence point position between the image pairs.

3. The apparatus of claim 1, wherein the image correspondence point position designating unit allows a user to manually designate the correspondence point position between the image pairs or applies a feature point detecting and tracking algorithm to automatically designate the correspondence point position between the image pairs.

4. The apparatus of claim 1, wherein the difference function defining element obtains the difference function using Equation below:

$$D(f) = \Sigma_{i=1,2,3} \cos^{-1}(r_i \cdot e_i),$$

where $r_i$ ($i$=1,2,3) is a vector forming an i-th column of a rotation matrix R, $e_1=[1,0,0]^T$, $e_2=[0,1,0]^T$, $e_3=[0,0,1]^T$, $\cos^{-1}(x)$ is an arc cosine function of x, and $r_i \cdot e_i$ is inner product of two vectors $r_i, e_i$.

5. The apparatus of claim 1, wherein the difference function defining element obtains the difference function using Equation below:

$$D(f) = \sum_{i=1,2,3} \cos^{-1}(r_i \cdot e_i) + \alpha \sqrt{\sum_{i=1,2,3} t_i^2},$$

where $r_i$ ($i$=1,2,3) of a first term is a vector forming an i-th column of a rotation matrix R, $e_1=[1,0,0]^T$, $e_2=[0,1,0]^T$, $e_3=[0,0,1]^T$, $\cos^{-1}(x)$ is an arc cosine function of x, $r_i \cdot e_i$ is inner product of two vectors $r_i, e_i$, a second term is the norm of a translation vector t, $t_i$ ($i$=1,2,3) is an i-th component of the translation vector t, and $\alpha$ is an arbitrary constant defining weight between the two terms.

6. The apparatus of claim 1, wherein the cost function defining element obtains the optimized focal length fopt that minimizes the cost function using the cost function defined by Equation below:

$$C(f) = \sum_{k=2}^{n} D_k(f),$$

where $D_k(f)$ is a difference function calculated between two image pairs P1 and Pk.

7. The apparatus of claim 1, wherein the cost function minimizing unit sets in advance a range of values that are used as the focal length of the camera as a search region, performs sampling on m equally divided sections of the search region, and stores sampled focal lengths.

8. The apparatus of claim 7, wherein the cost function minimizing unit comprises:
    an exhaustive search element for calculating values of cost functions with respect to focal lengths obtained by performing sampling on the m equally divided sections of the search region, and obtaining a focal length fmin corresponding to a minimum value of the calculated values of the cost functions; and
    a non-linear optimization element for applying a non-linear optimizing method using the obtained focal length fmin to obtain the optimized focal length fopt.

9. The apparatus of claim 8, wherein the non-linear optimization element obtains the optimized focal length that minimizes the cost function through the non-linear optimizing method that uses a Quasi-Newton method using the focal length fmin corresponding to the minimum value of the cost function as an initial value.

10. A method for estimating a focal length of a camera, the method comprising the steps of:
    designating a correspondence point position of each image pair with respect to all image pairs of an input 2D image;
    calculating a 3D coordinate of the designated correspondence point through a computer-vision algorithm;
    defining a difference function from a 3D coordinate axis result recovered by applying similarity transform relation of each image pair to the calculated 3D coordinate;
    obtaining sum of the defined difference functions with respect to all the image pairs to define the sum as a cost function C(f); and obtaining an optimized focal length fopt that minimizes the defined cost function in a set search region.

11. The method of claim 10, further comprising the step of applying a computer-vision algorithm including 5 points, 6 points, 7 points, and 8 points using the obtained focal length and the correspondence point position between the image pairs to estimate a shooting position and a posture of the camera.

12. The method of claim 10, wherein the step of defining the difference function comprises the steps of:
   recovering a 3D coordinate axis of each image pair from the calculated 3D coordinate of the each image pair; and
   comparing directions of 3D coordinate axes of 3D coordinate axes of recovered image pairs that are obtained from two different image pairs to define the difference function for calculating an angle difference between two 3D coordinate axes.

13. The method of claim 12, wherein the step of comparing the directions of the coordinate axes comprises expressing the angle difference between the 3D coordinate axes recovered from the two different image pairs in terms of a rotation matrix R, a translation vector t, and a proportional constant s of similarity transform Equation 1, and defining the difference function using Equations 2 and 3 so that the recovered 3D coordinate axes coincide with each other with respect to similarity transform Equation 1:

$$X_2 = sRX_1 + 1 \quad \text{Equation 1}$$

$$D(f) = \sum_{i=1,2,3} \cos^{-1}(r_i \cdot e_i) \quad \text{Equation 2}$$

$$D(f) = \sum_{i=1,2,3} \cos^{-1}(r_i \cdot e_i) + \alpha \sqrt{\sum_{i=1,2,3} t_i^2}, \quad \text{Equation 3}$$

where $r_i$ ($i=1,2,3$) is a vector forming an i-th column of a rotation matrix R, $e_1=[1,0,0]^T$, $e_2=[0,1,0]^T$, $e_3=[0,0,1]^T$, $\cos^{-1}(x)$ is an arc cosine function of x, $r_i \cdot e_i$ is inner product of two vectors $r_i, e_i$, $t_i$ ($i=1,2,3$) is an i-th component of the translation vector t, and $\alpha$ is an arbitrary constant defining weight between two terms.

14. The method of claim 13, wherein the step of defining the cost function comprises the steps of extending the defined difference function of Equation 2 to all the image pairs to repeatedly calculate values of the difference function of Equation 2 for respective image pairs, and defining sum total of the calculated values of the difference function for the respective images as a cost function of Equation 4:

$$C(f) = \sum_{k=2}^{n} D_k(f) \quad \text{Equation 4}$$

where $D_k(f)$ is a difference function calculated between two image pairs P1 and Pk.

15. The method of claim 13, wherein the step of defining the cost function comprises the steps of extending the defined difference function of Equation 3 to all the image pairs to repeatedly calculate values of the difference function of Equation 2 for respective image pairs, and defining sum total of the calculated values of the difference function for the respective images as a cost function of Equation 4:

$$C(f) = \sum_{k=2}^{n} D_k(f) \quad \text{Equation 4}$$

where $D_k(f)$ is a difference function calculated between two image pairs P1 and Pk.

16. The method of claim 10, wherein the step of obtaining the optimized focal length fopt comprises:
   calculating values of cost functions C(f) with respect to focal lengths fi (i=1, . . . , m), respectively, obtained by performing sampling on m equally divided sections of the set search region;
   applying an exhaustive search of multi-resolution to calculate a focal length fmin that minimizes the calculated value of the cost function C(f); and
   calculating an optimized focal length fopt that minimizes the cost function C(f) through a non-linear optimization algorithm using the focal length fmin as an initial solution.

17. An apparatus for estimating a focal length of a camera, the apparatus comprising:
   an image correspondence point position designating unit for designating a correspondence point position between image pairs in an input 2 dimension (D) image;
   a cost function defining unit for defining a cost function to obtain a focal length for camera self-calibration from the designated conespondence point position between the image pairs; and
   a cost function minimizing unit for calculating an optimized focal length fopt that minimizes the defined cost function, wherein the cost function minimizing unit sets in advance a range of values that are used as the focal length of the camera as a search region, performs sampling on m equally divided sections of the search region, and stores sampled focal lengths.

18. The apparatus of claim 17, wherein the cost function minimizing unit comprises:
   an exhaustive search element for calculating values of cost functions with respect to focal lengths obtained by performing sampling on the m equally divided sections of the search region, and obtaining a focal length fmin corresponding to a minimum value of the calculated values of the cost functions; and
   a non-linear optimization element for applying a non-linear optimizing method using the obtained focal length fmin to obtain the optimized focal length fopt.

19. The apparatus of claim 18, wherein the non-linear optimization element obtains the optimized focal length that minimizes the cost function through the non-linear optimizing method that uses a Quasi-Newton method using the focal length fmin corresponding to the minimum value of the cost function as an initial value.

* * * * *